US012782319B2

(12) United States Patent
Baskar et al.

(10) Patent No.: US 12,782,319 B2
(45) Date of Patent: Nov. 3, 2026

(54) METHOD AND SYSTEM FOR ASSESSING INTERNAL DEFECTS OF A MATERIAL

(71) Applicant: Wipro Limited, Bangalore (IN)

(72) Inventors: Akilan Baskar, Chennai (IN); Sujatha Jagannath, Bangalore (IN)

(73) Assignee: WIPRO LIMITED, Bangalore (IN)

(*) Notice: Subject to any disclaimer, the term of this patent is extended or adjusted under 35 U.S.C. 154(b) by 332 days.

(21) Appl. No.: 18/526,951

(22) Filed: Dec. 1, 2023

(65) Prior Publication Data

US 2025/0110084 A1 Apr. 3, 2025

(30) Foreign Application Priority Data

Sep. 29, 2023 (IN) ............................. 202341065784

(51) Int. Cl.

*G01N 29/04* (2006.01)
*G01N 29/07* (2006.01)
*G01N 29/44* (2006.01)

(52) U.S. Cl.

CPC ........... *G01N 29/043* (2013.01); *G01N 29/07* (2013.01); *G01N 29/44* (2013.01);
(Continued)

(58) Field of Classification Search

CPC ...... G01N 29/043; G01N 29/07; G01N 29/44; G01N 29/0645; G01N 29/069;
(Continued)

(56) References Cited

U.S. PATENT DOCUMENTS

| | | | | |
|---|---|---|---|---|
| 9,267,925 | B2 | 2/2016 | Bartuli et al. | |
| 10,641,738 | B2 * | 5/2020 | Guibert | G01N 29/04 |

(Continued)

FOREIGN PATENT DOCUMENTS

| | | | | |
|---|---|---|---|---|
| CN | 104950040 B | | 12/2017 | |
| CN | 111351860 A | | 6/2020 | |
| CN | 115356400 A | | 11/2022 | |
| JP | 7410723 | * | 1/2024 | G01N 29/4463 |

OTHER PUBLICATIONS

Jagannath, "Automating Wooden pole inspections and damage assessments using AI and robotics", Wipro Tech Blogs, Mar. 2022, XP093164003, 10 pages.
Extended European Search Report, dated May 31, 2024, in European Application No. EP 23213848.7, 9 pages.
Bandara et al., "Damage Severity Estimation of Timber Poles Using Stress Wave Propagation and Wavelet Entropy Evolution", ASME J. Nondestructive Evaluation, vol. 4, No. 1, https://doi.org/10.1115/1.4048148, Sep. 4, 2020, 13 pages.

(Continued)

*Primary Examiner* — John E Breene
(74) *Attorney, Agent, or Firm* — Finnegan, Henderson, Farabow, Garrett & Dunner, LLP

(57) ABSTRACT

Disclosed herein is a method and system for assessing one or more defects in a material. The method comprises extracting one or more assessment parameters from ultrasound waves propagated through a cross-section of the material. Further, the method identifies presence of one or more defects in the material by analyzing the one or more assessment parameters using a first machine learning model. Further, the method determines a position of each of one or more defects present in the material based on a graphical representation. Thereafter, the method determines a severity score and size of each of the one or more defects using a second machine learning model. Thus, an improved method and system for assessing one or more defects within a material by generating graphical representations of the one or more defects, thereby enhancing accuracy of defect detection is provided.

18 Claims, 8 Drawing Sheets
(1 of 8 Drawing Sheet(s) Filed in Color)

(52) U.S. Cl.
CPC ................ *G01N 2291/0238* (2013.01); *G01N 2291/0289* (2013.01); *G01N 2291/105* (2013.01)

(58) Field of Classification Search
CPC ............. G01N 29/2487; G01N 29/265; G01N 29/4481; G01N 2291/0289; G01N 2291/0238; G01N 2291/0258; G01N 2291/2626; G01N 2291/048; G01N 2291/106; G01N 2291/0234; G01N 2291/105; G01N 2291/011
USPC ............................................................ 73/598
See application file for complete search history.

(56) References Cited

U.S. PATENT DOCUMENTS

| | | | | |
|---|---|---|---|---|
| 11,079,358 | B2 | 8/2021 | Al-Buraik | |
| 11,175,277 | B2 | 11/2021 | More | |
| 11,619,610 | B2 | 4/2023 | Hall et al. | |
| 2014/0216158 | A1* | 8/2014 | Sanabria Martin et al. | G01N 33/46 |
| 2021/0302385 | A1* | 9/2021 | Jack | G01N 29/0654 |
| 2021/0350337 | A1 | 11/2021 | Butera | |
| 2022/0317095 | A1* | 10/2022 | Oliphant | G01N 29/07 |
| 2022/0381746 | A1* | 12/2022 | Emile | G01N 29/262 |
| 2023/0236153 | A1* | 7/2023 | Jack | G01N 29/46 73/625 |
| 2023/0273182 | A1 | 8/2023 | Chilakabathini et al. | |

OTHER PUBLICATIONS

Marchetti et al., "Non-Contact Ultrasonic Sensor for Density Measurement and Defect Detection on Wood", Research Gate, Jan. 2004, 8 pages.

Mu et al., "Detection and Classification of Wood Defects by ANN," 2006 International Conference on Mechatronics and Automation, IEEE, Luoyang, China, doi: 10.1109/ICMA.2006.257659, Dec. 2006, 5 pages.

* cited by examiner

3(a) 3(b)

5a

5b

| 180° Alignment | Recorded Time | Non-defective Time | Time Difference | Alignment Position | Severity Score |
|---|---|---|---|---|---|
| A-B | T1’ | T1 | T1’-T1 | P1 | S1 = (T1’-T1) * P1 |
| C-D | T2’ | T2 | T2’-T2 | P2 | S1 = (T2’-T2) * P2 |
| E-F | T3’ | T3 | T3’-T3 | P3 | S1 = (T3’-T3) * P3 |
| G-H | T4’ | T4 | T4’-T4 | P4 | S1 = (T4’-T4) * P4 |
| Overall Severity Score: | | | | | ∑ (S1, S2, S3, S4) |

Fig. 8

| Input features | | Output |
|---|---|---|
| Non-defective time | Recorded time | Actual defect size |
| 100 | 150 | 35mm |
| 122 | 143 | 20mm |
| ⋮ | | |
| 116 | 178 | 50mm |

Fig. 9

METHOD AND SYSTEM FOR ASSESSING INTERNAL DEFECTS OF A MATERIAL

TECHNICAL FIELD

The present disclosure generally relates to defect assessment systems and in particular relates to a method and system for assessing one or more defects in a material such as wooden utility poles.

BACKGROUND

The following description includes information that may be useful in understanding the present disclosure It is not an admission that any of the information provided herein is prior art or relevant to the presently claimed disclosure, or that any publication specifically or implicitly referenced is prior art.

For many years, power transmission and telecommunication companies have been relying predominantly on wooden utility poles to carry, distribute, and deliver power, and telecom signals all over the world. Since wood is a natural substance, which could degrade over time, they have to be monitored and maintained regularly. Failing to monitor and assess the condition of such poles will lead to disruption in the energy distribution system and could cause adverse safety issues.

Conventional methods for testing the wooden utility poles, such as hammer testing, require humans to climb the pole and carry out assessment of the wooden pole, which can pose a risk to human life in case of a damaged pole. Also, these assessment results are less accurate as they are subjective in nature and a lot depends on the intuition and experience of the investigator/pole tester. Moreover, such assessments are prone to errors and result in unnecessary replacement of poles, which could still be of service for some more years. Since the wooden poles can be degraded due to various internal and external factors, there is no inspection solution that exists currently to assess the health of the poles holistically and accurately.

Further, an effective pole inspection program must strike a balance between accurately identifying wooden poles that put both system reliability and human life at less risk while minimizing the number of serviceable poles being replaced. Due to combination of several variables, namely wood species, preservation methods, material, soil and climate conditions, insect and mechanical damage, inspection methodology, as well as the human errors involved, currently there exists no failsafe inspection method that can guarantee the condition of a standing wood pole with high accuracy. As a result, many poles are replaced unnecessarily, and a significant number of poles continue to fail unexpectedly, while they are still in service, causing damages to assets as well as human lives.

Moreover, existing non-destructive testing mechanisms are prone to non-standard outputs, resulting in misclassification of wood, and unnecessary replacement actions. Also, some of the existing non-destructive testing solutions require permanent mounting of equipment, for example mounting of acoustic sources, antenna, etc., on the wooden pole resulting in inconvenience and an increase in the maintenance cost.

One of the existing solutions disclosed in U.S. Pat. No. 11,079,358B2 provides a Wooden Pole Integrity Testing (WPIT) system that autonomously assesses the integrity of wooden poles in real-time. The WPIT system includes a testing subsystem that is coupled to each wooden pole and that can, in real-time, non-invasively gather diagnostics indicative of the integrity of each wooden pole. One or more acoustic sources (can be ultrasonic device), antenna, solar panel, power unit are mounted onto the pole. However, this prior art uses different equipment that must be mounted on each wooden pole. Millions of poles may require millions of such equipment, thus making the solution costly and increasing the maintenance cost. Also, the equipment mounted along the wooden pole makes it difficult for the pole tester to climb the wooden pole for fixing any fault. Also, the prior art, suggests emitting only two waves from the source to receiver for determining the pole integrity of the entire pole, thereby resulting in less accuracy.

Another existing solution disclosed in U.S. Pat. No. 11,175,277B2 provides a mechanism for evaluating the condition of a wooden structure. It uses an invasive technique to evaluate the condition of the wooden pole. One or more bore holes are drilled onto the pole for inserting a probing device having an image capturing device. However, the boring of multiple holes weakens the pole structure and can cause cracks. Bored holes, if not filled, can make water seep into such holes developing fungi and decay to grow. Also, the prior art suggests using hammering test as a prerequisite for boring the holes. After hammer sounding identifies area where the decay may exist, holes are bored. Due to this, the entire pole is not inspected, but only regions where hammer sounding is identified as decay presence are tested. Also, hammer testing is not an effective internal defect identification technique as it requires highly skilled and experienced personnel to assess the sound and judgement differs from person to person.

Thus, there exists a need for an improved method and system for assessing defects in a material, which overcomes the above-mentioned limitations of the conventional methods.

The above-mentioned drawbacks/difficulties/disadvantages of the conventional techniques are explained just for exemplary purpose and this disclosure and description mentioned below would never limit its scope only such problem. A person skilled in the art may understand that this disclosure and below mentioned description may also solve other problems or overcome the above-mentioned drawbacks/disadvantages of the conventional arts which are not explicitly captured above.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method of assessing one or more defects in a material is disclosed. The method comprises extracting one or more assessment parameters from ultrasound waves propagated through a cross-section of the material at each of the one or more predefined angles. Further, the method comprises identifying presence of one or more defects in the material by analyzing the one or more assessment parameters using a first machine learning model. Furthermore, the method comprises determining a position of each of one or more defects present in the material based on a graphical representation of the one or more defects. Thereafter, the method comprises determining a severity score and size of each of the one or more defects, corresponding to the position of each of the one or more defects determined on the graphical representation using a second machine learning model.

In one non-limiting embodiment of the present disclosure, a system for assessing one or more defects in a material is disclosed. The system comprises a memory and a processor coupled to the memory. The processor is configured to perform the steps mentioned in the above method using the first machine learning model and the second machine learning model.

Furthermore, the present disclosure relates to a non-transitory computer readable medium including instructions stored thereon that when processed by at least one processor, cause a sequence designing system to perform operations mentioned in the above method using the first machine learning model and the second machine learning model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The patent or application file contains at least one drawing executed in color. Copies of this patent or patent application publication with color drawing(s) will be provided by the Office upon request and payment of the necessary fee.

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which:

FIG. 8 illustrates an exemplary table depicting a determination of severity score for the cross-section of wooden pole, for implementing embodiments consistent with the present disclosure.

FIG. 9 illustrates an exemplary training data set for the second machine learning model to determine the size of the internal defect of the wooden pole, for implementing embodiments consistent with the present disclosure.

Figure 1:
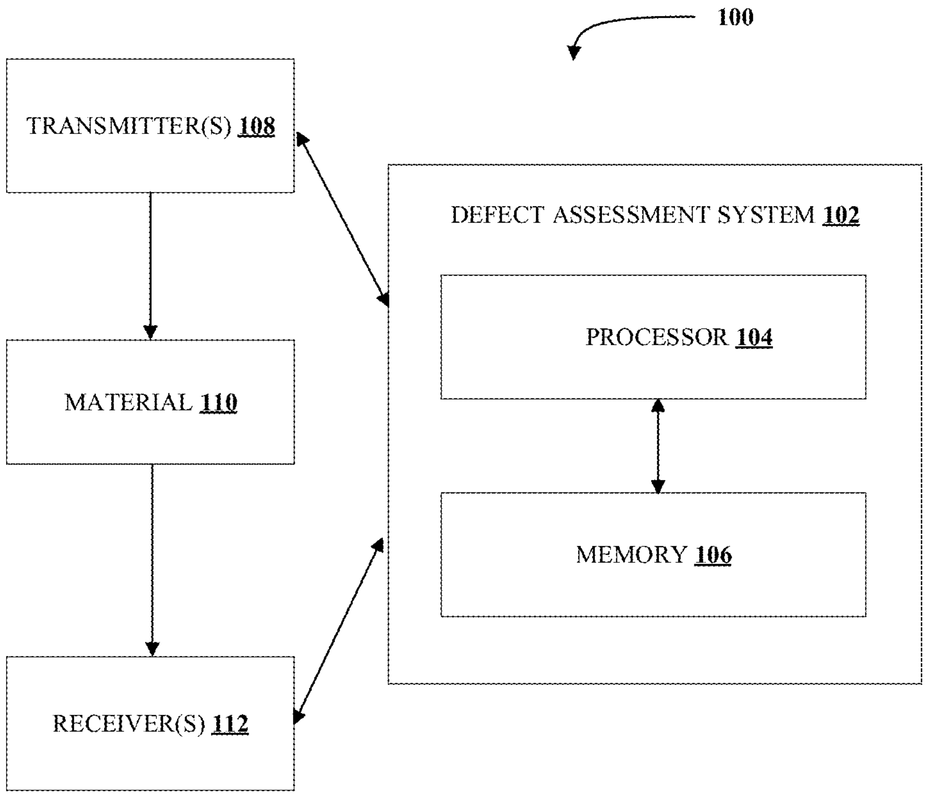
FIG. 1 shows an exemplary architecture of system for assessing one or more defects in a material, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present disclosure.

Currently, wooden utility pole companies are looking for non-destructive ways of inspecting the wooden poles rather than the hammer testing and other conventional methods. As internal defects are the primary reason for wood deterioration, determining precise location, severity and size of the internal defect is of utmost importance. Moreover, indication on the overall sustainability is also required to give the operators a holistic view about the condition of the wooden poles. To address these issues, the present disclosure provides an improved method and system for assessing one or more defects within a material (i.e., wooden pole) by generating graphical representations of the one or more defects, thereby enhancing accuracy of defect detection. Further, the present disclosure provides enhanced method and system for determining severity of the one or more defects. Additionally, the present disclosure provides an improved mechanism for estimating the size of the one or more defects in the material. To do so, the method and system disclosed in the present disclosure involve extracting one or more assessment parameters from ultrasound waves propagated through a cross-section of the material at each of the one or more predefined alignment angles. The method identifies presence of one or more defects in the material by analyzing the one or more assessment parameters using a first machine learning model. The first machine learning model is trained using defective and non-defective samples of the material. The method further determines a position of each of the one or more defects present in the material based on the graphical representation of the one or more defects. Thereafter, the method determines a severity score and size of each of the one or more defects corresponding to the position of each of the one or more defects determined on the graphical representation using a second machine learning model. In this manner, the present disclosure, unlike the conventional methods, localizes multiple and different types of defects with high accuracy using non-destructive testing. Also, the present disclosure automatically and intelligently determines defect position, severity, and size using the non-destructive testing of the material.

FIG. 1 shows an exemplary architecture 100 configured for assessing one or more defects in a material 110, in accordance with an embodiment of the present disclosure. The exemplary architecture 100 comprises a defect assessment system 102, a plurality of transmitters 108, a material 110, and a plurality of receivers 112. In some embodiments, the architecture 100 may comprise additional components to carry out the functionalities of the disclosure. In some embodiments, the defect assessment system 102, the plurality of transmitters 108 and the plurality of receivers 112 may be communicatively coupled with each other via a communication network (not shown in FIG. 1). In some embodiments, the one or more defects may comprise, but not limited to, cracks, holes, voids, decays and the like. In some embodiments, the material 110 may include a variety of species of woods from different geographies having defects of various types and sizes. In a limiting embodiment, the material 110 need not be limited to woods, but may include other material like concrete poles, hardened plastic/fiber plastic poles and the like.

In an embodiment, the defect assessment system 102 (alternatively referred to as system 102) may be any computing device, without limiting to, a personal computer, a laptop or a smartphone, which can be configured to perform the method of present disclosure. In some embodiments, the defect assessment system 102 may be used by operators, investigators or pole testers associated with power transmission and telecommunication companies to monitor and assess the condition of the material 110 under inspection. In one implementation, the defect assessment system 102 may comprise a processor 104 and a memory 106. However, the defect assessment system 102 may comprise additional components which may be required for performing functionalities in accordance with the present disclosure. As used herein, the term processor 104 may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In some embodiments, processor 104 may be configured to perform one or more functions of the defect assessment system 102 for assessing the one or more defects in the material 110. In some embodiments, the processor 104 may be configured to signal the plurality of ultrasound transmitter 108 to transmit ultrasound waves propagating through the cross-section of the material 110. In one implementation, the processor 104 may be configured to signal the plurality of ultrasound receivers 112 to receive the ultrasound waves propagating through the cross-section of the material 110.

In a non-limiting embodiment, the memory 106 may be an external memory chip or an inbuilt EEPROM memory, within the defect assessment system 102. In an embodiment, the memory 106 may be a computer-readable medium known in the art including, for example, volatile memory, such as static random-access memory (SRAM) and dynamic random-access memory (DRAM), and/or synchronous dynamic random-access memory (SDRAM) and/or non-volatile memory, such as read only memory (ROM), erasable programmable ROM, flash memories, hard disks, optical disks, and magnetic tapes. In some embodiments, the memory 106 may be communicatively coupled to the processor 104 and may be configured to store various data processed by the processor 104.

In some embodiments, the plurality of transmitters 108 may include, but not limiting, to an ultrasonic device for transmitting ultrasound waves or ultrasonic pulses through the cross-section of the material 110. The plurality of transmitters 108 may be placed at one or more predefined locations or alignments on an outer surface of the material 110. In some embodiments, the plurality of transmitters 108 may be controlled or signaled by the defect assessment system 102 for transmitting the ultrasound waves through the cross-section of the material 110. In some embodiments, the plurality of receivers 112 may include, but not limited to, an ultrasound receiver for receiving or capturing the ultrasound waves propagated though the cross-section of the material 110. The plurality of receivers 112 may be placed or positioned at one or more predefined locations, in alignment with respect to the position of the plurality of ultrasound transmitters 108. In some embodiments, the plurality of receivers 112 may be controlled or signaled by the defect assessment system 102 for capturing or receiving the ultrasound waves transmitted by the plurality of transmitters 108. In an exemplary embodiment, the plurality of receivers 112 may be configured to capture the ultrasound waves at 40 different alignments on the cross-section of the material 110. As used herein, the term “alignment” may refer to a pair of transmitter-receiver positioned at a predefined angle around the material (i.e., wooden pole).

In an embodiment, the defect assessment system 102 may be configured to receive data related to the ultrasound waves propagating between the transmitter 108 and the receiver 112 and perform a further processing of the data. In a non-limiting embodiment, the defect assessment system 102 may extract one or more assessment parameters including pulse velocity of the ultrasound waves, distance travelled by the ultrasound waves and time taken by the ultrasound waves while propagating through the cross-section of the material 110. Further, the defect assessment system 102 may be configured to identify presence of one or more defects in the material 110 by analyzing the one or more assessment parameters using a first machine learning model. The output of this step would be an indication of whether the material is “Defective” or “Non-defective”. In case the material 110 is found to be the “Defective”, the defect assessment system 102 may determine position of the one or more defects within the material 110 based on a graphical representation of the one or more defects. Afterwards, the defect assessment system 102 may determine severity and size of the one or more defects corresponding to the position of each of the one or more defects using a second machine learning model. Otherwise, if the material is identified to be “non-defective”, the defect assessment system 102 may generate a record of the “non-defective” material 110 and store it in a repository/database associated with the defect assessment system 102 for future references.

Figure 2:
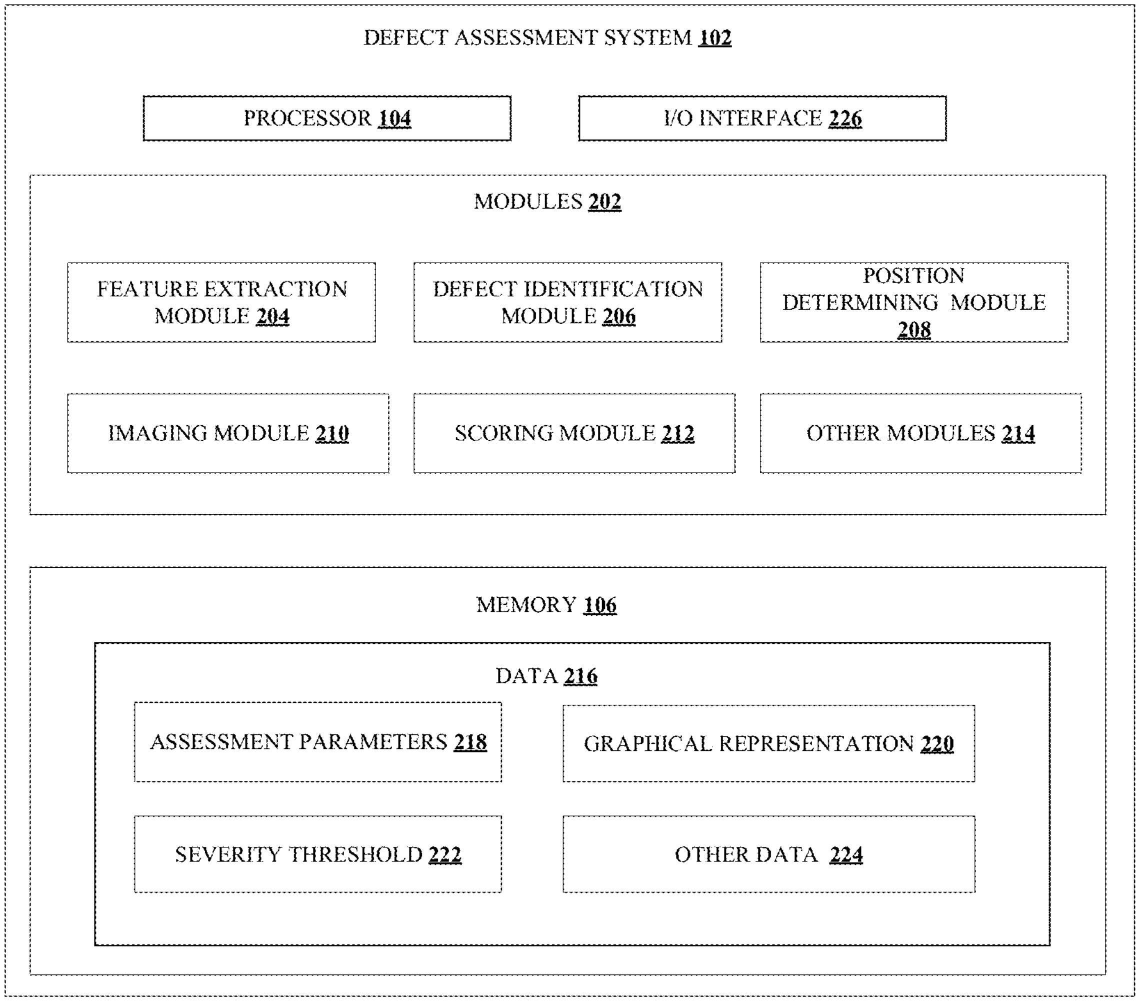
FIG. 2 shows a detailed block diagram of a defect assessment system for assessing the one or defects in the material, in accordance with an embodiment of the present disclosure.

FIG. 2 shows a detailed block diagram of a system for assessing the one or defects in the material 110, in accordance with an embodiment of the present disclosure.

In some implementations, the defect assessment system 102 may include the processor 104, the memory 106, one or more modules 202, data 216, and an Input/Output I/O interface 226. As used herein, the term modules 202 may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, the modules 202 may comprise, but not limited to, a feature extraction module 204, a defect identification module 206, a position determining module 208, an imaging module 210, a scoring module 212, and other modules 214. In one implementation, each of the modules 202 may be configured as stand-alone hardware computing units. In an embodiment, the other modules 214 may include modules that may be used to perform various miscellaneous functionalities of the defect assessment system 102. It shall be appreciated that such module may be represented as a single module or a combination of different modules.

In an embodiment, the data 216 stored in the memory 106 may include, without limitation, one or more assessment parameters 218, graphical representation 220, severity threshold 222, and other data 224. The other data 224 may include, but not limiting to, data such as values of lower limit of pulse velocity, data values of upper limit of pulse velocity, distance travelled by the ultrasound waves between the transmitter 108 and the receiver 112, time taken by the ultrasound waves, severity score, defect size, diameter of cross-section of the material 110 and the like. In some implementations, data 216 may be stored within the memory 106 in the form of various data structures. Additionally, the data may be organized using data models, such as relational or hierarchical data models. The other data 224 may include various temporary data and files generated by the processor 104 while performing various functions of the defect assessment system 102.

In an embodiment, the I/O interface 226 may be configured for performing functions such as, without limiting to, transmitting, and receiving one or more instructions to and from the plurality of ultrasound transmitters 108 and the plurality of ultrasound receivers 112. In some embodiments, the I/O interface 226 may be configured to cause a display of the visual representation of the heatmap related to the one or more defects identified to further analyze the severity and size of the one or more defects. Alternatively, the I/O interface 226 may include a variety of software and hardware interfaces, for example, a web interface, a graphical user interface, an input device, an output device, and the like for interacting with a user of the defect assessment system 102.

In an embodiment, the feature extraction module 204 may be configured to extract one or more assessment parameters 218 from the ultrasound waves, received at the plurality of receivers 112, which have propagated through a cross-section of the material 110 at one or more predefined alignment angles. The one or more assessment parameters 218 may include, but are not limited to, a pulse velocity (V) of the ultrasound waves, a time of arrival (T) of the ultrasound waves, and a distance (D) travelled by the ultrasound waves. As an example, the one or more assessment parameters 218 may be related by an equation V=D/T.

In some embodiments, the feature extraction module may be configured to measure the pulse velocity, the time of arrival and the distance travelled by the ultrasound waves. In accordance with the present disclosure, the time of arrival may be defined as a transit time taken by the ultrasound waves to travel between one of the plurality of transmitters 108 and one of the plurality of receivers 112 while propagating in a radial direction through the cross-section of the material 110. In some embodiments, the distance may be defined as a physical distance between the transmitter 108 and the receiver 112. In some embodiments, the feature extraction module may be configured to measure the pulse velocity as a function of the time of arrival and the distance travelled by the ultrasound waves. In an implementation, the pulse velocity, the time of arrival and the distance may be measured for 40 different alignments of the plurality of transmitters 108 and the plurality of receivers 112 for covering the maximum region on the cross-section of the material 110 and thereby enhance accuracy of the assessment. As an example, the alignments may correspond to alignment angles like 90°, 135°, 180°, 235° and 270° between the plurality of transmitters 108 and the plurality of receivers 112, resulting in 40 alignments or locations.

Further, the feature extraction module 204 may be configured to determine at least one lower limit of the pulse velocity (D_L) and at least one upper limit of the pulse velocity (D_U) for each of the one or more predefined alignment angles based on the measured pulse velocity, the time of arrival and the distance travelled by the ultrasound waves. To determine the D_L and D_U, the feature extraction module 204 may be configured to calculate a mean (Mean) and a standard deviation (SD) of the pulse velocity for each of the one or more predefined alignment angles. In an exemplary embodiment, the mean of the pulse velocity may be calculated for each of the one or more predefined alignment angles and represented as Mean_90, Mean_135, Mean_180, Mean_225, Mean_270. In a similar manner, the standard deviation of the pulse velocity may be calculated for each of the one or more predefined alignment angles and represented as SD_90, SD_135, SD_180, SD_225, SD_270.

In a non-limiting embodiment, the feature extraction module 204 may calculate the at least one lower limit of the pulse velocity (D_L) using equation (1) below:

$$\text{Lower limit (D\_L)} = \text{Mean} - SD \tag{1}$$

Thus, the lower limit (D_L) for each of the one or more predefined alignment angles may be calculated in the below manner:

$$\text{Lower limit\_90} = \text{Mean\_90} - \text{SD\_90} \quad \text{i.}$$

$$\text{Lower limit\_135} = \text{Mean\_135} - \text{SD\_135} \quad \text{ii.}$$

$$\text{Lower limit\_180} = \text{Mean\_180} - \text{SD\_180} \quad \text{iii.}$$

$$\text{Lower limit\_225} = \text{Mean\_225} - \text{SD\_225} \quad \text{iv.}$$

Based on the above, D_L may be calculated by subtracting the pulse velocity at an alignment (i.e., with respect to an alignment angle) with the lower limit with respect to the same angle. This gives 40 D_L values corresponding to 40 alignments.

In some embodiments, the feature extraction module 204 may calculate the at least one upper limit of the pulse velocity (D_U) using equation (2) below:

$$\text{Upper limit (D\_U)} = \text{Mean} + SD \tag{2}$$

Accordingly, the upper limit (D_U) for each of the one or more predefined alignment angles may be calculated in the below manner:

$$\text{Upper limit\_90} = \text{Mean\_90} + \text{SD\_90} \quad \text{i.}$$

$$\text{Upper limit\_135} = \text{Mean\_135} + \text{SD\_135} \quad \text{ii.}$$

$$\text{Upper limit\_180} = \text{Mean\_180} + \text{SD\_180} \quad \text{iii.}$$

$$\text{Upper limit\_225} = \text{Mean\_225} + \text{SD\_225} \quad \text{iv.}$$

-continued $$\text{Upper limit\_270} = \text{Mean\_270} + \text{SD\_270} \quad \text{v.}$$

Based on the above, D_U may be calculated by subtracting the Pulse velocity at an alignment with respect to an angle with the upper limit with respect to the same angle. This gives 40 D_U values corresponding to 40 alignments. It may be worth noting that the lower limit and the upper limit of the pulse velocity may be determined using any other alternative technique.

In some embodiments, the defect identification module 206 may be configured to identify presence of one or more defects in the material 110 by analyzing the one or more assessment parameters 218 using a first machine learning model. In an exemplary embodiment, the first machine learning model may be a machine learning model which is trained with a dataset containing data values from a variety of species and samples of the material 110. For example, in the case of 'wood' material 110, a dataset relating to wood species of different geographies, having variety of internal defects of varying size and severity are used to train the machine learning model for predicting the presence of the internal defects in the material 110 under inspection. In some embodiments, the first machine learning model may be trained with both defective samples of the material 110 and non-defective samples (i.e., samples having no defects) of the material 110.

In an embodiment, to identify the presence of the one or more defects in the material 110, the defect identification module 206 may initially create a matrix "K" based on the one or more assessment parameters 218 and the at least one lower limit of the pulse velocity (D_L) and the at least one upper limit of the pulse velocity (D_U) for each of the one or more predefined alignment angles. As an example, the matrix K may comprise a set of 40 data values of the one or more assessment parameters 218 corresponding to the one or more alignments with 40 rows and 3 columns. Here, the columns correspond to the measured arrival time, pulse velocity and distance. Further, the defect identification module 206 may be configured to append the at least one lower limit of the pulse velocity (D_L) and the at least one upper limit of the pulse velocity (D_U) to the dataset corresponding to one or more alignments so as to create two additional columns in the matrix "K". Thereafter, the presence of the one or more defects at any given cross-section may be determined by identifying the variations of pulse velocities among all 40 alignments. In an implementation, to represent data values corresponding to all 40 alignments, the matrix "K" may be converted to a column matrix of size 200*1.

In some embodiments, the defect identification module 206 may be configured to classify the cross-section of the material 110, corresponding to each of the one or more predefined alignment angles, as at least one of 'non-defective' and 'defective' by analysing the matrix "K" using the first machine learning model. In an exemplary embodiment, consider there are two class features namely, a "Non-defective (ND)" class and a "Defective (D)" class. One of the two class feature value is appended to the matrix "K", which makes the size of matrix to be 201*1. In a non-limiting embodiment, the actual data set may comprise many such "K" matrices of similar size, which may be computed and gathered from a variety of material species, from materials of different geographical conditions and with variety of the internal defects and defect sizes.

In some embodiments, to train the first machine learning model, the dataset is split into a training dataset comprising 80% of the dataset and a testing dataset comprising 20% of the dataset. The training dataset is further split into X_train and Y_train, where the X_train has N number of rows and 200 features and Y_train has N number of rows and one feature namely "Class", which is the output feature. As an example, "One-hot encoding" method may be performed to map the output feature so as to represent the categorical data (i.e., Classes) in binary vectors. In an exemplary embodiment, an Artificial Neural Network (ANN) model having 200 input nodes corresponding to 200 input features, 'X' number of hidden layers, and 2 output nodes corresponding to 2 different classes may be used for the analysis. Further, the ANN model may be designed to use "Adam gradient descent" or a similar optimization algorithm with a logarithmic loss function called "categorical cross entropy" for efficient analysis. This ANN model is evaluated by a K-fold cross validation method. The testing dataset may be shuffled, and 10 folds of dataset may be created to perform the evaluation. Using the ANN model, the first machine learning model is trained and prepared for identifying the presence of one or more defects in the material 110. It may be appreciated by a person skilled in the art that the first machine learning model may be trained using any other suitable technique too.

In other words, the first machine learning model consistent with those described above were used to predict whether the material under test is defective or non-defective. To accomplish this prediction, the machine learning model is trained to take more assessment parameters 218 and the at least one lower limit of the pulse velocity (D_L) and the at least one upper limit of the pulse velocity (D_U) for each of the one or more predefined alignment angles as inputs and to output a class representing whether the material-under test is "Defective" or "Non-defective". As the first machine learning model aims to take into account: lower limit of the pulse velocity (D_L) and the at least one upper limit of the pulse velocity (D_U) for each of the one or more predefined alignment angles, the detection accuracy of the presence or absence of the defect is improved irrespective of several interfering scenarios such as: contrast in physical properties (such as density, or moisture content) of the wood-under-test and signal-to-noise ratio (i.e., due to presence of background noises other than the ultrasound waves during testing of the wood).

In some embodiments, the position determining module 208 may be configured to determine a position of each of the one or more defects present in the material 110 based on a graphical representation 220 of the one or more defects. To determine the position of each of the one or more defects, the position determining module 208 may be configured to initially sort the pulse velocities of each of the or more predefined alignments into an ordered list. Further, the position determining module 208 may identify a highest velocity from the pulse velocity data of the 40 alignments. Further, a pulse velocity difference is derived for all the 40 alignments by subtracting each pulse velocity value against the identified highest pulse velocity. Further, the pulse velocity difference is sorted out in a descending order to create the ordered list or a 'pulse velocity list'. Further, the position determining module 208 may be configured to assign a weightage for each of the one or more predefined angles based on the ordered list. In other words, a weight is assigned to each alignment based on the pulse velocity for that particular alignment. Since, the ultrasound waves travel slower in the presence of the one or more defects, more weightage is provided to the alignments that have slower pulse velocity as compared to the faster pulse velocities.

In one embodiment, relative weightage is assigned to each of the alignments that have slower pulse velocity and the alignments that have faster pulse velocities. A higher weightage is assigned to the alignments that have slower pulse velocity as compared to the alignments that have faster pulse velocities, since the ultrasound waves travel slower in the presence of the one or more defects. Assigning of relative weights enables the defect assessment system 102 to make more accurate and informed decision regarding actual assessment of severity percentage of a defect in the material. In other embodiment, in presence of more than one defect, priority may be given to the one or more defects located at the center. since the defects located at the center of the material 110 may weaken the material greatly compared to peripheral defects. In such case, the position of the one or more defects located at the center may be identified, and more weightages may be assigned to the one or more defects located at the center as compared to peripheral defects.

In some embodiments, from the ordered list, the weights are assigned based on equation (3) below:

$$\text{Weight for each alignment} = \left(a * \sqrt{a} * \text{pulse velocity } \mathit{diff}/\text{pulse velocity}\right) \tag{3}$$

wherein, $$a = \sqrt{40 - i}$$

'i' varies from 0 to 39 as per pulse velocity list.

In an embodiment, considering there are 40 alignments, a slowest alignment may take a value of √40, next alignment may take a value of √39 and so on. Similarly, the last alignment may take a value of V. The "pulse velocity" may represent the pulse velocity for the alignment for which weight is calculated. Further, the variable "pulse velocity diff" may represent the pulse velocity difference for the alignment for which weight is calculated. It may be noted that the value "(pulse velocity diff/pulse velocity)" decreases as the pulse velocity list is traversed in descending order, since the pulse velocity difference is the highest for the slowest alignment. Therefore, more weight may be assigned to the slowest alignment.

Figure 3:
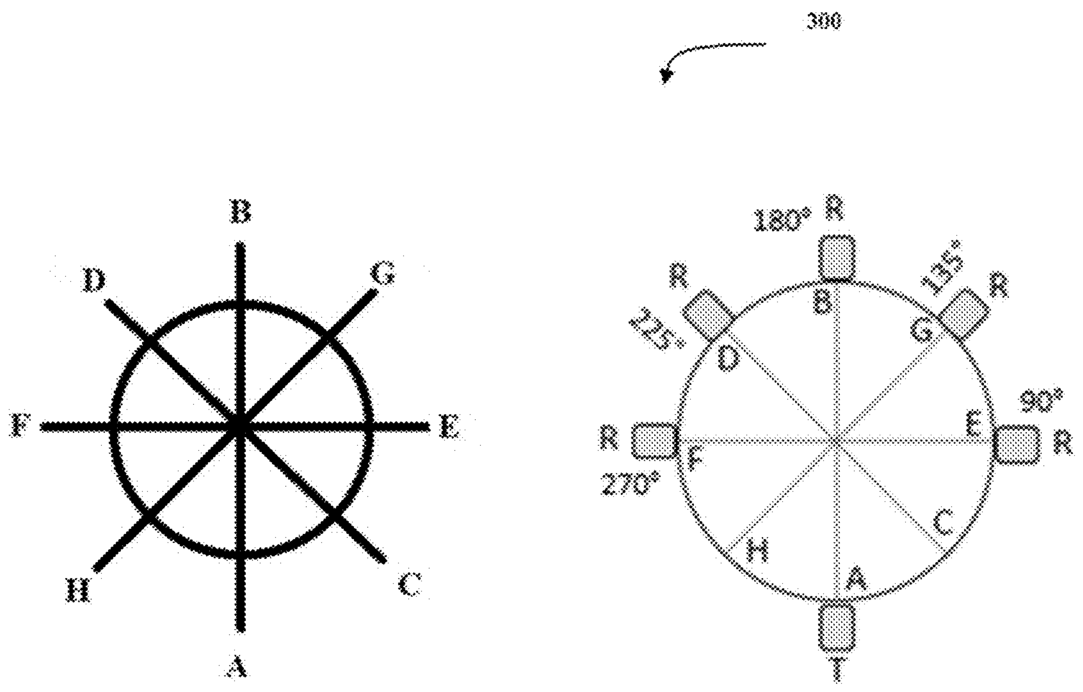
FIG. 3 shows an exemplary illustration of one or more predefined alignment angles of the material for recording ultrasound waves, in accordance with an embodiment of the present disclosure.

Further, the position determining module 208 may be configured to create a mesh grid corresponding to the cross-section of the material 110 for each of the one or more predefined alignment angles based on the weightage of each of the predefined alignment angles. For creating the mesh grid, a cross-section of the material 110 may be correlated to a graphical circular contour comprising a mesh of points. For representing the cross-section of the material 110 graphically, a circular mesh grid is utilized to later generate the graphical representation 220 that may indicate position of the one or more defects. As an example, the graphical representation 220 may be a heatmap visualization captured using the imaging module 210. The mesh grid may contain 10,000 points that are linearly spaced. Each point on the mesh grid maps to the actual region in the cross-section of the material 110. A distance between all the points in the mesh grid with respect to all the alignments may be calculated using the co-ordinate information of the mesh grid. For example, the distance between a point P1 in the mesh with respect to an alignment A-B (as shown in FIG. 3) is calculated using the distance from point 'A' to the line equation mentioned below. Considering that the point P1 has a coordinate of (x0, y0), point 'A' has a coordinate of (x1, y1) and 'B' has a coordinate of (x2, y2), then the distance of P1 from A and B may be calculated using the equation (4) below:

$$\text{distance}(P1, A-B) = \frac{|(x_2 - x_1)(y_1 - y_0) - (x_1 - x_0)(y_2 - y_1)|}{\sqrt{(x_2 - x_1)^2 + (y_2 - y_1)^2}} \tag{4}$$

In a similar manner, a point P2 may be chosen and the distance between the point P2 and A-B alignment may be calculated. This process may be repeated for all the points in the mesh grid for all the alignments. In some embodiments, the distance may be represented as distance (i.e., point, alignment).

In some embodiments, the position determining module 208 may be further configured to create a value matrix using the distance and the assigned weight. For each alignment, the value for each point in the mesh grid may be obtained by multiplying the distance of that point with respect to that alignment and the weight of that alignment. In other words, the value for each point in the mesh grid may be calculated using the equation (5) below:

$$\text{value} = \left(\text{distance(point, alignment)} * \left(a * \sqrt{a} * \text{pulse velocity } \mathit{diff}/\text{pulse velocity}\right)\right) \tag{5}$$

As an example, since there are 10,000 points in the mesh grid, for each alignment there would be 10,000 values, each value corresponding to a point. Thus, the values for all the 10,000 points, with respect to each alignment may be represented as matrix with 100 rows and 100 columns. In some embodiments, a first row and a first column of the matrix may contain the value of first point in the mesh grid. Further, the first row and second column of the matrix may contain the value of the second point and so on and so forth. Accordingly, each row may contain values of 100 points, and since there are 100 rows, the matrix may comprise values of all the 10,000 points. In some embodiments, as there are 40 alignments, the position determining module 208 may be configured to create 40 such matrices, one for each alignment. The 40 matrices of 100*100 are added to derive a value matrix of 100*100, comprising a single value for each point of the mesh grid. Thus, the value matrix contains the values of all the points within the mesh grid. This process ensures that the points are assigned values based on their proximity to the defects. It may be noted that points that are closer to the defective region may have higher value compared to the points in the non-defective region.

In some embodiments, when distance between all the points in the mesh grid with respect to each alignment may be calculated. The points which may be in a proximity (for example, with a distance threshold of 20 units) with each alignment may be considered. The distance of points that are closer to each alignment are only multiplied with the weights of that alignment to obtain value as per the equation (5) shown above. For creating the matrix of 100*100 for that alignment, the calculated value may be used for points within distance threshold and rest of the points may be assigned a value of 0. This may result in more accurate allocation of value to the points for determining defect position and then generating the visualization. In some embodiments, upon determining the position of the one or more defects, the imaging module 210 may be configured to generate the visual representation or graphical representation 220 of the one or more defects. The detailed explanation of the graphical representation 220 is provided with reference to FIG. 4.

In some embodiments, the scoring module 212 may be configured to determine a severity score and size of each of the one or more defects, corresponding to the position determined on the graphical representation 220 of each of the one or more defects, using a second machine learning model. In order to determine the severity score, the scoring module 212 may be configured to determine a time difference between an arrival time of the cross-section having the one or more defects with an arrival time of a cross section of having no defects for each of the one or more predefined alignments angles. The arrival time of the cross-section having the one or more defects may be determined using the process mentioned hereafter.

In an exemplary embodiment, the time of arrival of the 180° alignment may be used in which the transmitter 108 and the receiver 112 are placed exactly opposite to each other. There are eight such possible alignments, for example, as shown by connections A-B, C-D, E-F, G-H, B-A, D-C, F-E and H-Gin FIG. 3. Considering that four alignments i.e., A-B, C-D, E-F & G-H may be selected from the eight alignments, the receiver 112 may be configured to record the arrival time of these alignments may be called as recorded time. For example, 'T1', 'T2', 'T3', and 'T4' may be the recorded time of the 180° alignments A-B, C-D, E-F & G-H respectively. In a non-limiting embodiment, all eight 180° alignments may be used for better accuracy of assessment. In another embodiment, an average of opposite alignments i.e., A-B & B-A, C-D & D-C, E-F & F-E, and G-H & H-G may be taken to reach at final four alignments.

In some embodiments, the arrival time of the cross section having no defects (interchangeably used as non-defective time) for each of the one or more predefined alignment angles may be determined using the process mentioned hereafter. In accordance with the present disclosure, the arrival time of the cross section of having no defects may be defined as the time taken by the ultrasound waves to travel in the absence of defects in the material 110. For example, 'T1', 'T2', 'T3', and 'T4' may be defined as the non-defective time of the 180° alignments A-B, C-D, E-F & G-H respectively. Further, the arrival time of the cross section of having no defects of the 180° alignments may be considered as distance of the alignments divided by the pulse velocity of ultrasonic pulses in a non-defective material 110.

In an exemplary embodiment, in case of a 'wood' material, for different wood species, the pulse velocity of ultrasound waves may usually lie between 1600 m/s to 2000 m/s. Further, the speed with which the ultrasound waves travel in a non-defective wood species may be 1800 m/s and above. Considering an average pulse velocity of 1800 m/s, for non-defective wood, the pulse velocity is constant. The distance information may be already recorded in the data. It may be well appreciated by a person skilled in that the ultrasound waves may travel faster or may take less time in absence of defects. Whereas the ultrasound waves may travel slower or may take longer time in presence of defects. Hence, the severity of the one or more defects may be determined by an amount of time the ultrasound waves take to travel through the cross-section of the material 110. More time the ultrasound waves take, the bigger or more severe the defect may be identified and vice versa. In other words, the percentage of severity of the one or more defects is directly proportional to the arrival time (i.e., amount of time the ultrasound waves take to travel through the cross-section of the material). Thereafter, the difference in the time may be determined between the arrival time for the cross-section having the one or more defects with an arrival time of a cross section having no defects, to determine the extent of deviation.

In some embodiments, the scoring module 212 may be further configured to determine an alignment position for the one or more predefined alignment angles based on the pulse velocity of each of the one or more predefined alignment angles. As used herein, the term "alignment position" may be defined as different combinations of transmitter-receiver position. To determine the alignment position, the pulse velocity list may be used to identify the positions or indexes of the A-B, C-D, E-F & G-H at 180° alignments. The pulse velocity list may be sorted in a way such that the slowest alignments may be placed at a top of the list and have higher positions or indexes. The fastest alignments having lower positions or indexes may be sorted in the lower end of the list. Thus, the alignment positions or indexes of the four 180° alignments may be identified from the pulse velocity list. For example, if A-B alignment is the slowest alignment and is placed at the top of the list (because of an internal defect between A and B), then its alignment position or index is 40. Similarly, if C-D alignment lies at place 10 in the list, then its alignment position or index is 31. If E-F alignment is at last position in the list, then its alignment position or index is 1. The alignment position or index may be calculated using equation (6) below:

$$\text{Alignment Position} = \text{Total alignment} - \text{Alignment place in the pulse velocity list} + 1 \tag{6}$$

For example, $$\text{Index }(A-B) = 40 - 1 + 1 = 40,$$

$$\text{Index }(C-D) = 40 - 10 + 1 = 31$$

$$\text{Index }(E-F) = 40 - 40 + 1 = 1.$$

The alignment position or index of four 180° alignments A-B, C-D, E-F & G-H may be termed as 'P1', 'P2', 'P3', and 'P4'. Further, it may be well appreciated by a person skilled the art that the one or more defects located at the center of the material 110 may weaken the material greatly compared to peripheral defects. Hence, priority may be given to the one or more defects located at the center. In the presence of the one or more defects located at the center, the alignment positions or indexes of the 180° alignments will be higher and vice versa. Thus, the position of the one or more defects located at the center may be identified, and more weightages may be assigned to the one or more defects located at the center as compared to peripheral defects. Further, the scoring module 212 may be configured to calculate the severity score for the material 110 based on the above identified time difference and alignment position. For example, the severity score may be calculated using equation (7) below:

$$\text{Severity Score} = \sum (\text{Time difference} \times \text{Alignment Position}) \tag{7}$$

Where:

Time difference=(The arrival time of the cross-section having the one or more defects−The arrival time of a cross section of having no defects.

Alignment position=Position or indexes of A-B, C-D, E-F & G-H

In an exemplary embodiment, the severity score (S1, S2, S3, S4) for the four 180° alignments may be computed and summed as shown in an exemplary table as shown in FIG. 8 to compute the severity score for the material 110.

In some embodiments, the scoring module 212 may be configured to compare the severity score with a predetermined severity threshold 222. In an exemplary embodiment, the severity threshold 222 may be a severity score value corresponding to an internal defect, whose size 10% of the total diameter of the material. It may be worth noting that the value of the severity threshold 222 may vary for different type of material with different diameters. In a non-limiting embodiment, the severity threshold 222 for different diameters of the material 110 may be calculated (explained in detail with reference to FIG. 5) and used as a reference during real-time assessment. For example, if the diameter of the wood is 400 mm, the severity threshold 222 may 10% of 400 mm, which is 40 mm internal defect size. Similarly, for a material of 200 mm diameter, the severity threshold 222 may be an internal defect size is 20 mm. The scoring module 212 may be configured to classify the defect as a “severe” defect upon determining that the severity score exceeds the predetermined severity threshold 222. Whereas the scoring module 212 may be configured to classify the defect as a “non-severe” defect upon determining that the severity score is lesser or equal to the predetermined severity threshold 222.

In accordance with the present disclosure, the scoring module 212 may be further configured to determine the size of the one or more defects. The scoring module 212 may be configured to compare the arrival time of the cross-section having the one or more defects with the arrival time of the cross section having no defects for each of the one or more predefined alignment angles using the second machine learning model. In some embodiments, the second machine learning model may be trained with arrival time of the cross-section having no defects and arrival time of the cross-section having defects of varying sizes for each of the or more predefined alignment angles. For example, the arrival time of the cross-section may be collected on various material samples having internal defects of varying sizes for 180° alignments. Further, the arrival time of the cross-section having no defects may be collected for the same material. In some embodiments, for a given defective material, along with the arrival time of the cross-section having internal defects and arrival time of the cross-section having no defects, the dimension of the internal defect i.e., internal defect size may be noted. In a non-limiting embodiment, a new training dataset for training the second machine learning model using the dataset created as shown in an example table as shown in FIG. 9.

As indicated above, the training dataset may comprise the arrival time of the cross-section having no defects (time taken by ultrasound waves in the absence of the internal defect) and the arrival time of the cross-section having defects (transit time recorded by the receiver 112) of all the 180° alignments as input features and internal defect size as the label/output feature. In some embodiments, a regression-based machine learning model may be built, and the training dataset may be fed for the training of the second machine learning model. The regression model is a supervised model, which understands the relationship between the input features and the label/output features. The second machine learning model provides the correlation between the arrival time of the cross-section having no defects, the arrival time of the cross-section having defects, and the defect size. Once the training is completed, the second machine learning model may be tested on new defective samples of the material 110, that are not included in the training dataset earlier. In an exemplary embodiment, data such as the material identified as ‘Severe’ or ‘Not severe’, the arrival time of the cross-section having no defects, the arrival time of the cross-section having defects, can be fed to the trained second machine learning model. Thereafter, the trained second machine learning model may be used to predict the internal defect size in a real-time scenario.

Based on the above, it may be apparent that the present disclosure is capable of determining severity and size of the one or more defects present in the material 110. This may help in assessing the strength of the material 110 based on the determined severity of the one or more defects. Further, precautionary measures can be taken to determine the remaining life of the material 110 based on the determined strength of the material 110. In this manner, the present disclosure, unlike the conventional methods, efficiently and reliably localizes multiple and different types of defects with high accuracy using non-destructive testing methods.

In some embodiments, the scoring module 212 may be further configured to generate a defect assessment record comprising information related to at least one of the one or more defects, the one or more assessment parameters 218, the position of the one or more defects, the severity score of the one or more defects, and the visual representation of the one or more defects. In some embodiments, the defect assessment records may be a health record, which may include the total number of cross-sections tested along the length of the material, number of cross-sections detected as defective, the severity (including severity score) of such detected internal defect, the size of such detected internal defect, and a color based heatmap visualization or graphical representation 220 of the position of internal defects at the corresponding cross-section of the material. The defect assessment records help in further analysis of the material and may be treated as an important source for data collection in related purposes. The defect assessment records may also be used to set standardized testing procedures. Additionally, the defect assessment record may help pole testers and investigators to decide further maintenance or replacement activities for the material. Moreover, defect assessment record may be added to a repository/database of the defect assessment system 102 and may be updated through different test-cycles of the given specimen under inspection.

FIG. 3 illustrates one or more predefined alignment angles of the material 110 for recording ultrasound waves, in accordance with the present disclosure. FIG. 3*a* depicts one or more alignment points ‘A’, ‘B’, ‘C’, ‘D’, ‘E’, ‘F’, ‘G’ and ‘H’, which are marked on the cross-section of the material 110. The plurality of transmitters 108 and the plurality of receivers 112 may be placed around these alignment points for transmitting ultrasound waves and receiving the ultrasound waves, respectively. In some embodiments, for a given transmitter position, five corresponding receiver position readings may be collected. In some embodiments, the alignments immediately adjacent to the transmitter 108 may be excluded, as shown in FIG. 3*b*. For example, for point A, C and H may be excluded. Since there are 8 points or alignments, which are equally spaced and 45 degrees apart, this will result in a total of 8*5 i.e., 40 combinations of alignments. The 40 combinations of the alignments may include, for example, A-E, A-G, A-B, A-D, A-F, B-F, B-H, B-A, B-C, B-E, C-G, C-B, C-D, C-F, C-H, D-H, D-A, D-C, D-E, D-G, E-B, E-D, E-F, E-H, E-A, F-A, F-C, F-E, F-G, F-B, G-D, G-F, G-H, G-A, G-C, H-C, H-E, H-G, H-B, H-D. These 40 combinations of points ensure that the maximum region within the cross-section is covered. With the plurality of transmitters 108 and the plurality of receivers 112 positioned at each of the above alignments, data values for three parameters are recorded. In some embodiments, 10 readings per alignment may be taken and an average is computed to obtain data values for each alignment. In some embodiments, as shown in FIG. 3*b*, the transmitter 108 and the receiver 112 alignments corresponding to angle 90 are represented as A-E, C-G, E-B, G-D, B-F, D-H, F-A, H-C and may be named as Align_90°. Similarly, other angles may be represented in following manner below:

i. Align_90°=[A-E, C-G, E-B, G-D, B-F, D-H, F-A, H-C]

ii. Align_135°=[A-G, C-B, E-D, G-F, B-H, D-A, F-C, H-E]

iii. Align_180°=[A-B, C-D, E-F, G-H, B-A, D-C, F-E, H-G]

iv. Align_225°=[A-D, C-F, E-H, G-A, B-C, D-E, F-G, H-B]

v. Align_270°=[A-F, C-H, E-A, G-C, B-E, D-G, F-B, H-D]

It may be noted that FIG. 3 is provided merely as an exemplary scenario and should not be taken into limiting embodiment. Also, it may be worth noting that the above-mentioned process is performed on a variety of material species for creating a dataset for machine learning models in accordance with the present disclosure.

Figure 4:
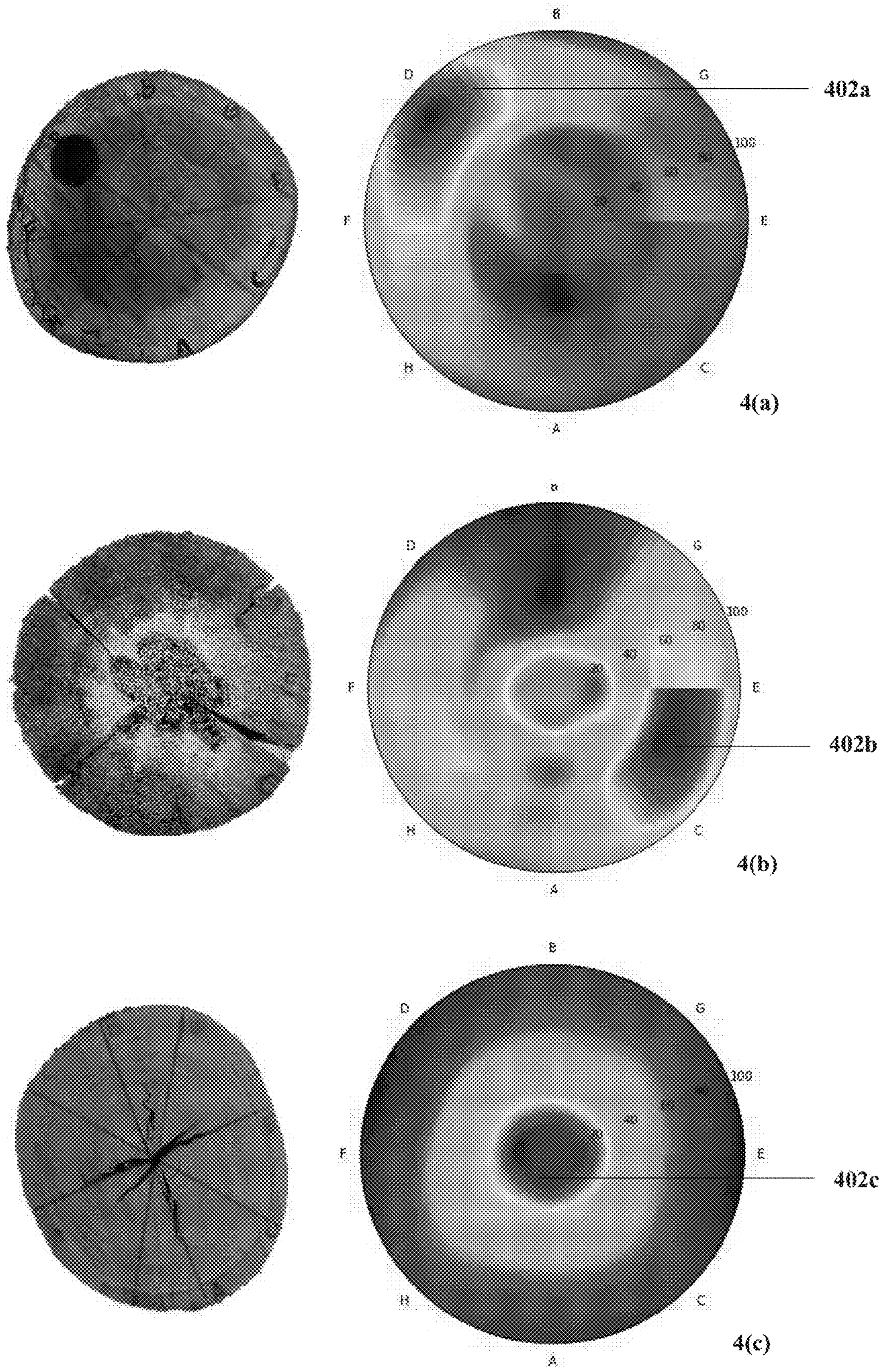
FIG. 4 shows an exemplary graphical representation of the one or more defects in the material, in accordance with an embodiment of the present disclosure.

FIG. 4 shows an exemplary graphical representation 220 of the one or more defects in the material 110, in accordance with an embodiment of the present disclosure. In some embodiments, the graphical representation 220 may be a visualization model. The graphical representation 220 depicted in 4(*a*), 4(*b*), and 4(*c*) may be used to precisely localize the position of one or more defects within the material. In other words, the visualization model of the present disclosure can easily and accurately localize the position of different types of defects (i.e., cracks, holes, voids, decays, and the like.) which are present at multiple locations within the material 110. In an exemplary embodiment, the graphical representation 220 may clearly indicate that the defect is at location 402*a* as shown in an image 4(*a*), and the defect is at center location 402*b* as shown in the image 4(*b*). In another exemplary embodiment, the graphical representation 220 may clearly indicate that the defect is at location 402*b*, as shown in the image 4*c*. In some embodiments, for generating the graphical representation 220 a value matrix is mapped to a color spectrum in 'Red' color and non-defective region in 'Blue' color based on a value of 10,000 points in the value matrix. In some embodiments, the 'Red' color may represent points with higher value i.e., defective region, while the 'Blue' color represents points with lesser value i.e., non-defective regions. It may be worth noting that the graphical representation 220 may be generated for any contour without being necessarily circular and may work on all species or structure of the material. In case of woods, the wooden structure may include, but not limiting to, wooden blocks, plywood, and the like. With the help of graphical representation 220, the position and location of the one or more defects may be depicted, so that the testers/operators can easily and accurately identify defect location and analyze the internals of the wooden structure.

Figure 5:
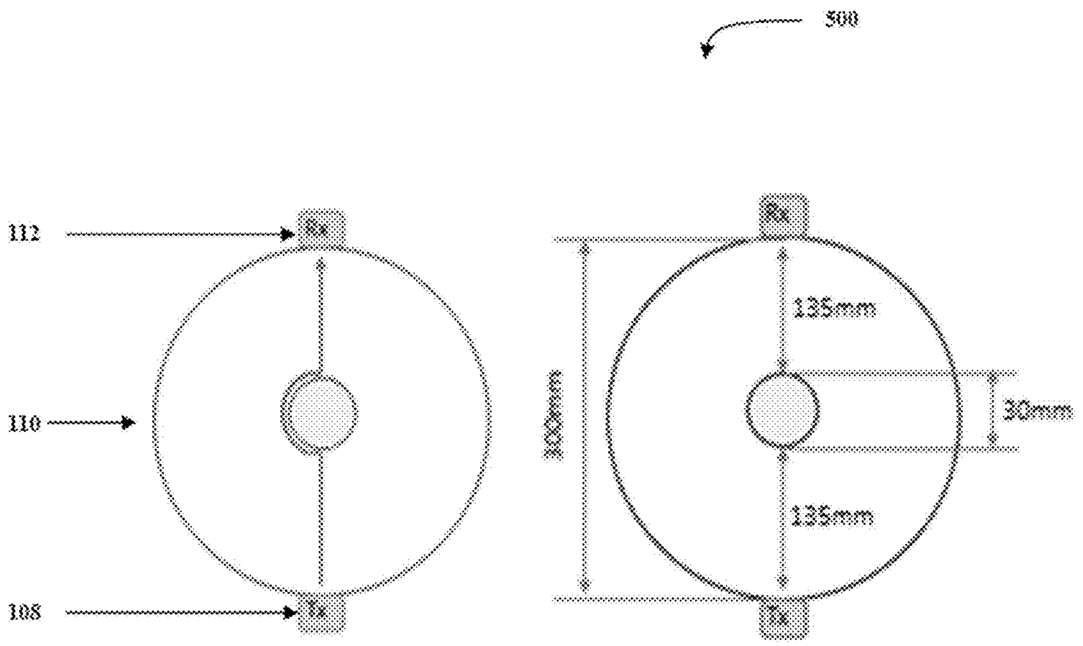
FIG. 5 shows an exemplary cross-section of a material with an internal defect, in accordance with an embodiment of the present disclosure.

FIG. 5 shows an exemplary scenario of a cross-section of a material 110 with an internal defect and calculating severity score and size of the internal defect, in accordance with an embodiment of the present disclosure. In a non-limiting embodiment, as shown in 5(*a*) a transmitter 108 may transmit an ultrasonic pulse, which travels through the cross-section of the material 110. Further, a receiver 112 may receive the ultrasonic pulse propagated through the cross-section of the material 110. In an exemplary embodiment, the transmitter 108 may be placed opposite to the receiver 112 as shown in 5(*a*). As shown in 5(*b*), a transmitter 108 may transmit an ultrasonic pulse, which would take a transmit time of 176 μs approximately to travel in a wood of diameter 300 mm with 30 mm internal defect size (i.e., 10% of 300 mm). The time taken by the ultrasonic pulse to travel in the presence of the defect is calculated based on the defect size i.e., 10% of the wood diameter. The calculated time is compared with the arrival time of the cross section of having no defects to calculate the time difference. In the presence of the defect, the ultrasonic pulse goes around the defect to reach the receiver 112 as shown in 5(*a*). Further, considering the defect to be 10% of the diameter, distance of the alignment may be calculated using equation (8) below:

$$\text{Total distance} = (0.9^{*}d) + \pi^{*}0.1^{*}d/2 \tag{8}$$

Thus, the transmit time with 10% of the defect may be calculated using total distance from the equation (8) and pulse velocity of 1800 m/s. The arrival time of the cross section of having no defects may be calculated by using diameter of the wood and pulse velocity of 1800 m/s. The time difference between the transit time and the arrival time of the cross section of having no defects may be calculated and denoted as 'Time difference (10% of diameter)'. As an example, the transit time for the wood with defect or time taken to travel through the cross-section of wood having defects may be calculated as:

$$\text{Total distance} = (0.9^{*}300) + \pi^{*}0.1^{*}300/2 = 317.12\text{ mm}$$

$$\text{Pulse velocity} = 1800\ m/s.\ \text{(As explained previously)}$$

$$\text{Transit time} =$$

$$\text{Total distance/Pulse velocity} = 317.12\text{ mm}/1800\text{ m/s} = 176\ \mu s.$$

Further, the transit time in case of a wood without any defects or time taken to travel through the cross-section of wood without defects may be calculated by:

$$\text{Total distance} = 300\text{ mm}$$

$$\text{Pulse velocity} = 1800\text{ m/s}$$

$$\text{Non-defective time} = 300\text{ mm}/18.00\text{ m/s} = 166\ \mu s.$$

Which means, the arrival time of the cross section of having no defects (i.e., transit time for wood without defect or non-defective time) for the same wood is 166p s. Therefore, the time difference (10% of diameter)=176 μs−166 μs=10 μs.

In some embodiments, to identify the internal defect position, indexes of the A-B, C-D, E_F & G-H corresponding to 180° alignment needs to be identified using a pulse velocity list. In case the internal defect size is of 10% of the wood diameter, then all the 180° alignments lie in the middle section of the pulse velocity list. Thus, as shown in 5(*a*) and 5(*b*), the 180° alignment position or indexes can take up the value 20 (Middle alignment position). Further, a severity score is a product of time difference and alignment position may be calculated using below equation:

$$\text{Severity score(one alignment)} = \text{Time difference(10\% of diameter)} * \text{Middle alignment position}$$

Similarly for 4 alignments:

$$\text{Severity Threshold} = 4 * \text{Severity score (one alignment)}$$

For example, for a wood sample of 300 mm diameter:

$$\text{Severity score (one alignment)} = 10 \times 20 = 200$$

$$\text{Severity Threshold} = 4 * 200 = 800.$$

Therefore, a value 800 may be set as the severity threshold 222 for a wood of 300 mm diameter. The severity threshold 222 is the severity score value if there is an internal defect of size 10% of the wood diameter. It may be worth noting that the severity threshold 222 may vary for different diameter woods. Once the severity score is calculated, the severity score is compared with the severity threshold 222. If the severity score is greater than the severity threshold 222, the wood may be categorized as "Severe". Whereas, if the severity score is lesser or equal to the severity threshold 222, the wood may be categorized as "Non-severe". From the above it may be concluded that the internal defect size of more than 10% of wood cross-section's diameter may be indication of a growing incipient decay. Thus, the present disclosure helps to identify the internal defects of wood, which may potentially deteriorate the structural strength of the wooden pole over time.

Figure 6:
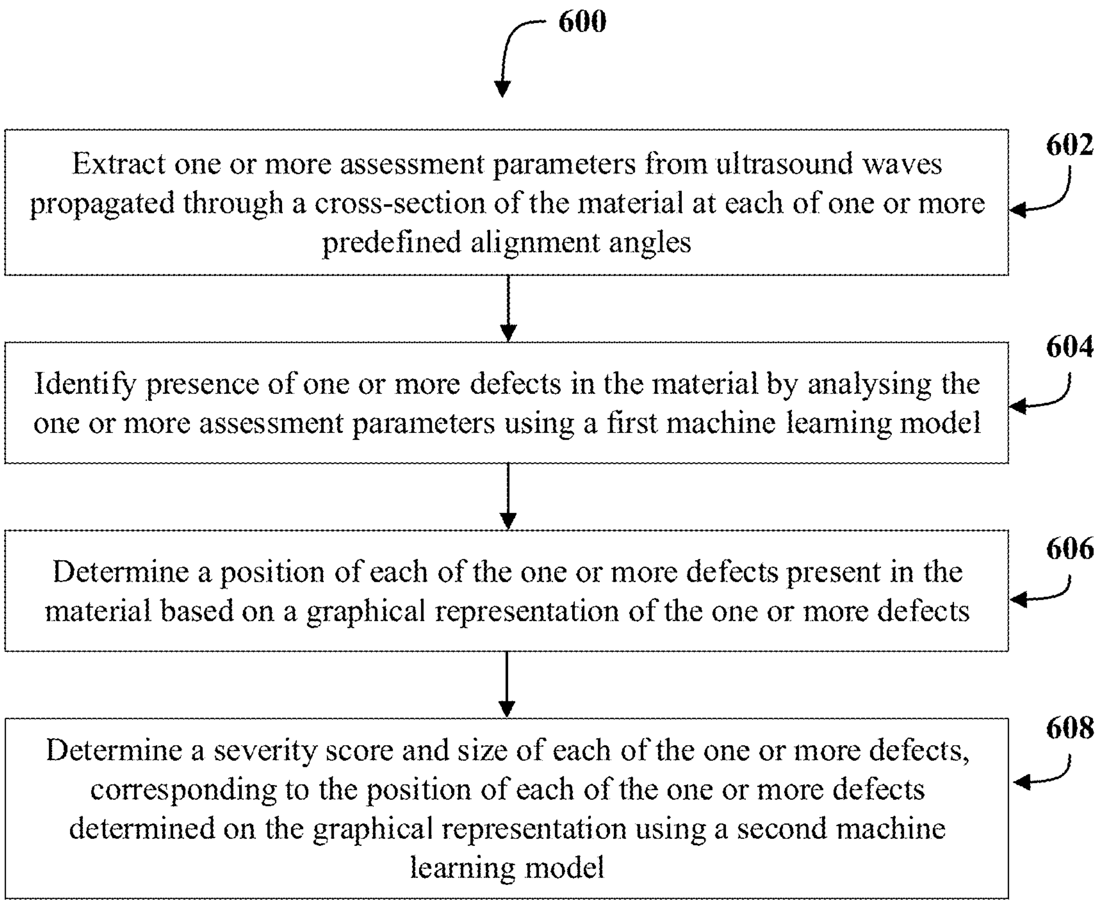
FIG. 6 shows a flowchart depicting a method of assessing the one or more defects in the material, in accordance with an embodiment of the present disclosure.

FIG. 6 depicts a method 600 of assessing one or more defects in a material 110, in accordance with an embodiment of the present disclosure. The method 600 may be described in the general context of computer executable instructions. Generally, computer executable instructions may include routines, programs, objects, components, data structures, procedures, modules, and functions, which perform specific functions or implement specific abstract data types.

The order in which the method 600 is described is not intended to be construed as a limitation, and any number of the described method blocks may be combined in any order to implement the method. Additionally, individual blocks may be deleted from the methods without departing from the spirit and scope of the subject matter described. Further, it may be noted that the method 600 may be performed by the processor 104 or any other sub-components of the modules of the system 102, as shown in FIGS. 1 and 2. The description of FIG. 6 is provided with reference to FIGS. 1-2.

At block 602, the method 600 comprises extracting one or more assessment parameters 218 from ultrasound waves propagated through a cross-section of the material 110 at each of one or more predefined angles. The method at block 602 may be performed by the feature extraction module 204. In accordance with the present disclosure, prior to extracting the one or more assessment parameters 218, the method may comprise signaling a plurality of ultrasound transmitters 108 placed at one or more predefined locations on an outer surface of the material 110. The plurality of ultrasound transmitter 108 may transmit ultrasound waves through the cross-section of the material 110. Further, the method may comprise signalling a plurality of ultrasound receivers 112, positioned at the one or more predefined alignment angles with respect to the plurality of ultrasound transmitters 108, to receive the ultrasound waves propagating through the cross-section of the material 110. Once the ultrasound waves are received, the method may comprise measuring a pulse velocity, a time of arrival and a distance travelled by the ultrasound waves for each of the one or more predefined alignment angles. Further, the method may determine at least one lower limit of the pulse velocity (D_L) and at least one upper limit of the pulse velocity (D_U) for each of the one or more predefined alignment angles based on the measured pulse velocity, the time of arrival and the distance travelled by the ultrasound waves. In some embodiments, the at least one lower limit of the pulse velocity (D_L) and at least one upper limit of the pulse velocity (D_U) are generated based on a mean and standard deviation of the pulse velocities for each of the one or more predefined alignment angles, a mean of the pulse velocities for each of the one or more predefined alignment angles and a standard deviation of the pulse velocities for each of the one or more predefined alignment angles.

Further, the method 600 at block 604 comprises identifying presence of one or more defects in the material 110 by analyzing the one or more assessment parameters 218 using a first machine learning model. The method 600 at block 604 may be performed by the defect identification module 206. To identify the presence of the one or more defects, the method may create a matrix based on the one or more assessment parameters 218 and the at least one lower limit of the pulse velocity (D_L) and the at least one upper limit of the pulse velocity (D_U) for each of the one or more predefined alignment angles. Thereafter, the method may classify the cross-section of the material 110, corresponding to each of the one or more predefined alignment angles, as at least one of 'non-defective' and 'defective' by analysing the matrix using the first machine learning model.

The method 600 at block 606 comprises determining a position of each of the one or more defects present in the material 110 based on a graphical representation 220 of the one or more defects. The method 600 at block 606 may be performed by the position determining module 208. In some embodiments, the method may determine the position of the one or more defects by sorting the pulse velocity of each of the one or more predefined alignment angles into an ordered list. Further, the method may assign a weightage for each of the one or more predefined alignment angles based on the ordered list and create a mesh grid corresponding to the cross-section of the material 110 for each of the one or more predefined alignment angles based on the weightage of each of the predefined alignment angles. Finally, the method may correlate each point of the mesh grid with a graphical cross section of the material 110 for generating the graphical representation 220 of the one or more defects for determining the position of the one or more defects in the material 110. In some embodiments, upon determining the position of the one or more defects, the method may further generate the visual representation of the one or more defects.

The method 600 at block 608 comprises determining a severity score and size of each of the one or more defects, corresponding to the position of each of the one or more defects determined on the graphical representation 220 using a second machine learning model. The method 600 at block 608 may be performed by the scoring module 212. In some embodiments, to determine the severity score the method may comprise determining a time difference between an arrival time of the cross-section having the one or more defects with an arrival time of a cross section of having no defects for each of the one or more predefined alignments angles. The arrival time is time of arrival of the ultrasound waves at plurality of ultrasound receivers 112, for each of the one or more predefined alignment angles. Further, the method may comprise determining an alignment position for the one or more predefined alignment angles based on the pulse velocity of each of the one or more predefined alignment angles. Thereafter, the method may comprise evaluating severity of the one or more defects for each of the one or more predefined alignments angles based on the time difference and the alignment position. Based on the severity of the one or more defects for each of the one or more predefined alignments angles, the method may determine the severity score of the one or more defects.

In some embodiments, the method may comprise comparing the severity score with a predetermined severity threshold 222. Upon determining that the severity score exceeds the predetermined severity threshold 222, the method classifies the defect as "a severe defect". Whereas upon determining that the severity score is lesser or equal to than the predetermined severity threshold 222, the method classifies the defect as "a non-severe defect".

In some embodiments, the method may comprise determining the size of the one or more defects by comparing the arrival time of the cross-section having the one or more defects with the arrival time of the cross section having no defects for each of the one or more predefined alignment angles using the second machine learning model.

In some embodiments, the method may comprise generating a defect assessment record comprising information related to at least one of the one or more defects, the one or more assessment parameters 218, the position of the one or more defects, the severity score of the one or more defects, and the visual representation of the one or more defects.

Computer System

Figure 7:
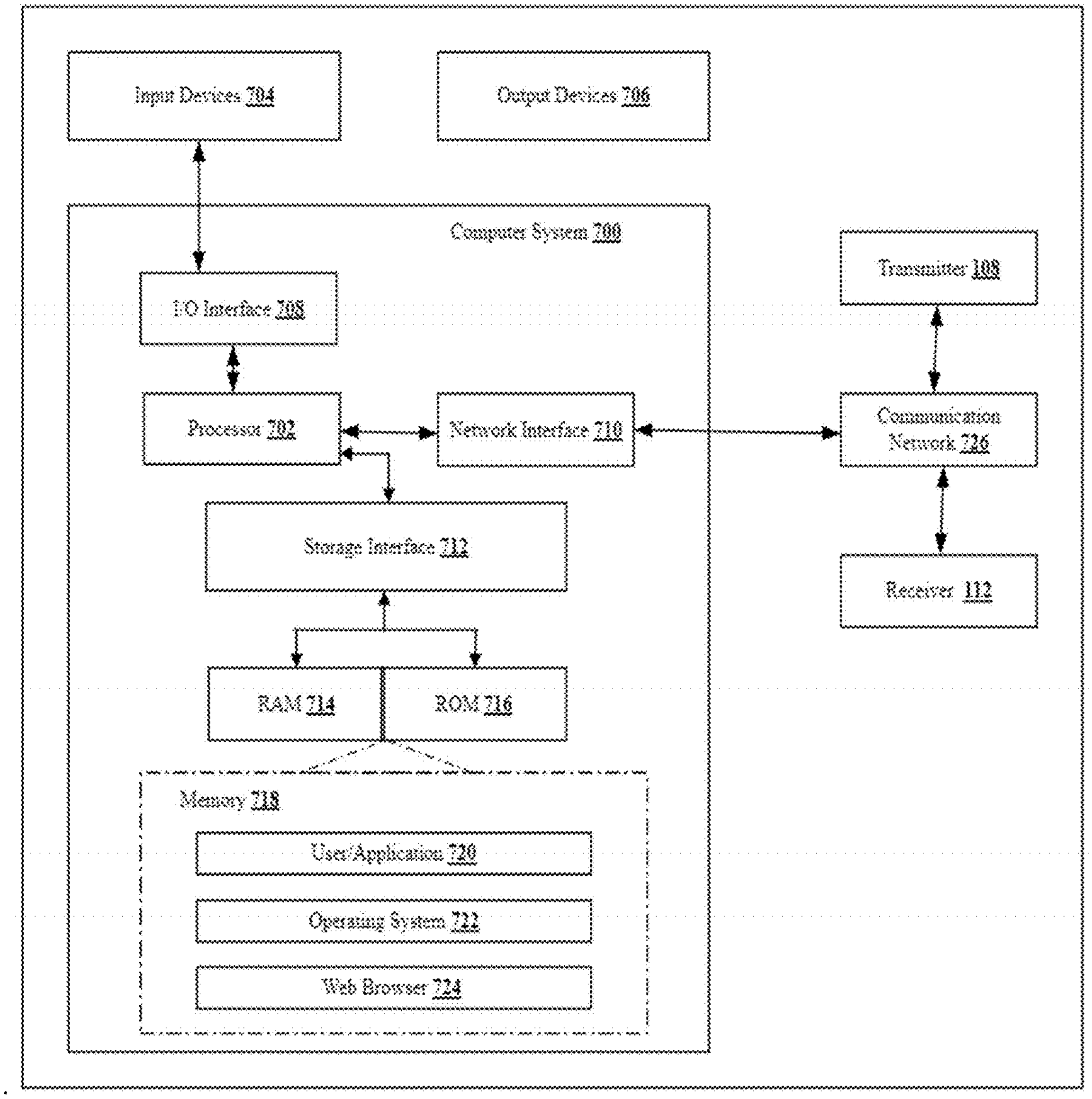
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 may be the system 102 illustrated in FIG. 1, which may be used for assessing one or more defects in a material 110. The computer system 700 may include a central processing unit ("CPU" or "processor") 702. The processor 702 may comprise at least one data processor for executing program components for executing user- or system-generated business processes. The processor 702 may include specialized processing units such as integrated system (bus) controllers, memory management control units, floating point units, graphics processing units, digital signal processing units, and the like. In an embodiment, the processor 702 may be used to realize the processor 104 described in FIG. 1 and FIG. 2.

The processor 702 may be disposed in communication with one or more Input/Output (I/O) devices (704 and 706) via I/O interface 708. In some embodiments, the processor 702 may be disposed in communication with a communication network 726 via a network interface 710. The network interface 710 may communicate with the communication network 726. Using the network interface 710 and the communication network 726, the computer system 700 may connect with a plurality of transmitters 108 for transmitting ultrasound waves through a cross-section of the material 110 and a plurality of receivers 112 for receiving ultrasound waves from the cross-section of the material 110.

In an implementation, the communication network 726 may be implemented as one of the several types of networks, such as intranet or Local Area Network (LAN) and such within the organization. The communication network 726 may either be a dedicated network or a shared network, which represents an association of several types of networks that use a variety of protocols. In some embodiments, the agricultural data platform 108 and the one or more sensors 110 may communicate with the computer system 700 via the communication network 726. In some embodiments, the processor 702 may be disposed in communication with a memory 718 (e.g., RAM 714, ROM 716. as shown in FIG. 7) via a storage interface 712.

The memory 718 may store a collection of program or database components, including, without limitation, user/application interface 720, an operating system 722, a web browser 724, and the like. In some embodiments, computer system 700 may store user/application data 720, such as the data, variables, records, and the like. as described in this disclosure. In an embodiment, the memory 718 may be used to realize the memory 106 described in FIG. 1 and FIG. 2. The operating system 722 may facilitate resource management and operation of the computer system 700. The user interface 720 may facilitate display, execution, interaction, manipulation, or operation of program components through textual or graphical facilities. For example, the user interface 720 may provide computer interaction interface elements on a display system operatively connected to the computer system 700. The web browser 724 may be a hypertext viewing application. Secure web browsing may be provided using Secure Hypertext Transport Protocol (HTTPS), Secure Sockets Layer (SSL), Transport Layer Security (TLS), and the like.

A description of an embodiment with several components in communication with each other does not imply that all such components are required. On the contrary, a variety of optional components are described to illustrate the wide variety of possible embodiments of the disclosure. When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Reference Numeral | Description |
|---|---|
| 102 | Defect assessment system |
| 104 | Processor |
| 106 | Memory |
| 108 | Transmitter |
| 110 | Material |
| 112 | Receiver |
| 202 | Modules |
| 204 | Feature extraction module |
| 206 | Defect identification module |
| 208 | Position determining module |
| 210 | Imaging module |
| 212 | Scoring module |
| 214 | Other modules |
| 216 | Data |
| 218 | Assessment parameters |
| 220 | Graphical representation |
| 222 | Severity threshold |
| 224 | Other data |
| 700 | Exemplary computer system |
| 702 | Processor of the computer system |
| 704 | Input devices |
| 706 | Output devices |
| 708 | I/O interface of the computer system |
| 710 | Network interface |
| 712 | Storage interface |
| 714 | RAM |
| 716 | ROM |
| 718 | Memory of the computer system |
| 720 | User/Application interface |
| 722 | Operating system |
| 724 | Web browser |
| 726 | Communication network |

What is claimed is:

1. A method of assessing one or more defects in a material, the method comprising:

extracting, by a processor of a defect assessment system, one or more assessment parameters from ultrasound waves propagated through a cross-section of the material at each of one or more predefined alignment angles;

identifying, by the processor of the defect assessment system, presence of one or more defects in the material by analysing the one or more assessment parameters using a first machine learning model;

determining, by the processor of the defect assessment system, a position of each of the one or more defects present in the material based on a graphical representation of the one or more defects; and determining, by the processor of the defect assessment system, a severity score and size of each of the one or more defects, corresponding to the position of each of the one or more defects determined on the graphical representation, wherein determining the severity score comprises analysing defect-related parameters using a second machine learning model, wherein determining the size of each of the one or more defects comprises comparing an arrival time of a cross-section having the one or more defects with an arrival time of a cross-section having no defects for each of the one or more predefined alignment angles using the second machine learning model, wherein the second machine learning model is trained with arrival times of cross-sections having no defects and the arrival times of cross-sections having defects of varying sizes for each of the one or more predefined alignment angles, and identifying the size of each of the one or more defects based on the comparison.

2. The method of claim 1, wherein prior to extracting the one or more assessment parameters from the ultrasound waves, the method further comprises:

signalling, by the processor of the defect assessment system, a plurality of ultrasound transmitters placed at one or more predefined locations on an outer surface of the material to transmit the ultrasound waves through the cross-section of the material; and signalling, by the processor of the defect assessment system, a plurality of ultrasound receivers, positioned at the one or more predefined alignment angles with respect to the plurality of ultrasound transmitters, to receive the ultrasound waves propagating through the cross-section of the material.

3. The method of claim 1, wherein extracting the one or more assessment parameters from the ultrasound waves further comprises:

measuring a pulse velocity, a time of arrival and a distance travelled by the ultrasound waves for each of the one or more predefined alignment angles; and determining at least one lower limit of the pulse velocity (D_L) and at least one upper limit of the pulse velocity (D_U) for each of the one or more predefined alignment angles based on the measured pulse velocity, the time of arrival and the distance travelled by the ultrasound waves, wherein the at least one lower limit of the pulse velocity (D_L) and at least one upper limit of the pulse velocity (D_U) are generated based on a mean of the pulse velocities for each of the one or more predefined alignment angles and a standard deviation of the pulse velocities for each of the one or more predefined alignment angles.

4. The method of claim 3, wherein identifying the presence of the one or more defects in the material, further comprises:

creating a matrix based on the one or more assessment parameters and the at least one lower limit of the pulse velocity (D_L) and the at least one upper limit of the pulse velocity (D_U) for each of the one or more predefined alignment angles; and classifying the cross-section of the material, corresponding to each of the one or more predefined alignment angles, as at least one of 'non-defective' and 'defective' by analysing the matrix using the first machine learning model, wherein the first machine learning model is trained with both defective and non-defective samples of the material.

5. The method of claim 1, wherein determining the position of the one or more defects comprises:

sorting the pulse velocity of each of the one or more predefined alignment angles into an ordered list;

assigning a weightage for each of the one or more predefined alignment angles based on the ordered list;

creating a mesh grid corresponding to the cross-section of the material for each of the one or more predefined alignment angles based on the weightage of each of the predefined alignment angles; and correlating each point of the mesh grid with a graphical cross section of the material for generating the graphical representation of the one or more defects for determining the position of the one or more defects in the material.

6. The method of claim 1, wherein upon determining the position of the one or more defects, further comprising generating the visual representation of the one or more defects.

7. The method of claim 1, wherein determining the severity score of the one or more defects comprising:

determining a time difference between the arrival time of the cross-section having the one or more defects with the arrival time of a cross section having no defects for each of the one or more predefined alignments angles, wherein the arrival time is time of arrival of the ultrasound waves at plurality of ultrasound receivers, for each of the one or more predefined alignment angles;

determining an alignment position for the one or more predefined alignment angles based on the pulse velocity of each of the one or more predefined alignment angles;

evaluating percentage of severity of the one or more defects for each of the one or more predefined alignments angles based on the time difference and the alignment position; and determining the severity score of the one or more defects, based on the percentage of severity of the one or more defects.

8. The method of claim 7, further comprising:

comparing the severity score with a predetermined threshold severity score; and classifying the defect as one of:

a severe defect upon determining that the severity score exceeds the predetermined severity threshold; and a non-severe defect upon determining that the severity score is lesser or equal to than the predetermined severity threshold.

9. The method of claim 1, further comprising:

generating a defect assessment record comprising information related to at least one of the one or more defects, the one or more assessment parameters, the position of the one or more defects, the severity score of the one or more defects, and the visual representation of the one or more defects.

10. A defect assessment system for assessing one or more defects in a material, the defect assessment system comprising:

a memory; and a processor, coupled to the memory, wherein the processor is configured to:

extract one or more assessment parameters from ultrasound waves propagated through a cross-section of the material at each of one or more predefined alignment angles;

identify presence of one or more defects in the material by analysing the one or more assessment parameters using a first machine learning model;

determine a position of each of the one or more defects present in the material based on a graphical representation of the one or more defects; and determine a severity score and size of each of the one or more defects, corresponding to the position determined on the graphical representation, wherein determining the severity score comprises analysing defect-related parameters using a second machine learning model, wherein determining the size of each of the one or more defects comprises comparing an arrival time of a cross-section having the one or more defects with an arrival time of a cross-section having no defects for each of the one or more predefined alignment angles using the second machine learning model, wherein the second machine learning model is trained with arrival times of cross-sections having no defects and the arrival times of cross-sections having defects of varying sizes for each of the one or more predefined alignment angles, and identifying the size of each of the one or more defects based on the comparison.

11. The defect assessment system of claim 10, wherein prior to extracting the one or more assessment parameters from the ultrasound waves, the processor is further configured to:

signal a plurality of ultrasound transmitters placed at one or more predefined locations on an outer surface of the material to transmit the ultrasound waves through the cross-section of the material; and signal a plurality of ultrasound receivers, positioned at the one or more predefined alignment angles with respect to the plurality of ultrasound transmitters, to receive the ultrasound waves propagating through the cross-section of the material.

12. The defect assessment system of claim 10, wherein to extract the one or more assessment parameters from the ultrasound waves, the processor is further configured to:

measure a pulse velocity, a time of arrival and a distance travelled by the ultrasound waves for each of the one or more predefined alignment angles; and determine at least one lower limit of the pulse velocity (D_L) and at least one upper limit of the pulse velocity (D_U) for each of the one or more predefined alignment angles based on the measured pulse velocity, the time of arrival, the distance travelled by the ultrasound waves, a mean of the pulse velocities for each of the one or more predefined alignment angles and a standard deviation of the pulse velocities for each of the one or more predefined alignment angles.

13. The defect assessment system of claim 10, wherein to identify the presence of the one or more defects in the material, the processor is further configured to:

create a matrix based on the one or more assessment parameters and the at least one lower limit of the pulse velocity (D_L) and the at least one upper limit of the pulse velocity (D_U) for each of the one or more predefined alignment angles; and classify the cross-section of the material, corresponding to each of the one or more predefined alignment angles, as at least one of 'non-defective' and 'defective' by analysing the matrix using the first machine learning model, wherein the first machine learning model is trained with both defective and non-defective samples of the material.

14. The defect assessment system of claim 10, wherein to determine the position of the one or more defects, the processor is further configured to:

sort the pulse velocity of each of the one or more predefined alignment angles into an ordered list;

assign a weightage for each of the one or more predefined alignment angles based on the ordered list;

create a mesh grid corresponding to the cross-section of the material for each of the one or more predefined alignment angles based on the weightage of each of the predefined alignment angles; and correlate each point of the mesh grid with a graphical cross section of the material for generating the graphical representation of the one or more defects for determining the position of the one or more defects in the material.

15. The defect assessment system of claim 10, wherein upon determining the position of the one or more defects, the processor is further configured to generate the visual representation of the one or more defects.

16. The defect assessment system of claim 10, wherein to determine the severity score of the one or more defects, the processor is further configured to:

determine a time difference between the arrival time of the cross-section having the one or more defects with the arrival time of a cross section having no defects for each of the one or more predefined alignments angles;

determine an alignment position for the one or more predefined alignment angles based on the pulse velocity of each of the one or more predefined alignment angles;

evaluate severity of the one or more defects for each of the one or more predefined alignments angles based on the time difference and the alignment position; and determine the severity score of the one or more defects, based on the percentage of severity of each of the one or more defects.

17. The defect assessment system of claim 16, wherein the processor is further configured to:

compare the severity score with a predetermined threshold severity score; and classify the defect as one of:

a severe defect upon determining that the severity score exceeds the predetermined severity threshold; and a non-severe defect upon determining that the severity score is lesser or equal to than the predetermined severity threshold.

18. A non-transitory computer readable medium including instructions stored thereon that when processed by at least one processor, cause a sequence designing system to perform operations comprising:

extracting one or more assessment parameters from ultrasound waves propagated through a cross-section of the material at each of one or more predefined alignment angles;

identifying presence of one or more defects in the material by analysing the one or more assessment parameters using a first machine learning model;

determining a position of each of the one or more defects present in the material based on a graphical representation of the one or more defects; and determining a severity score and size of each of the one or more defects, corresponding to the position of each of the one or more defects determined on the graphical representation, wherein determining the severity score comprises analysing defect-related parameters using a second machine learning model, wherein determining the size of each of the one or more defects comprises comparing an arrival time of a cross-section having the one or more defects with an arrival time of a cross-section having no defects for each of the one or more predefined alignment angles using the second machine learning model, wherein the second machine learning model is trained with arrival times of cross-sections having no defects and the arrival times of cross-sections having defects of varying sizes for each of the one or more predefined alignment angles, and identifying the size of each of the one or more defects based on the comparison.

* * * * *